United States Patent
Ehlin et al.

(10) Patent No.: US 9,158,306 B2
(45) Date of Patent: Oct. 13, 2015

(54) CENTERING ABOVE A PREDETERMINED AREA OF A LANDING PLATFORM

(75) Inventors: Johan Ehlin, Linköping (SE); Tomas Högström, Linköping (SE)

(73) Assignee: SAAB AB, Linköping (SE)

(*) Notice: Subject to any disclaimer, the term of this patent is extended or adjusted under 35 U.S.C. 154(b) by 375 days.

(21) Appl. No.: 13/377,758

(22) PCT Filed: Jun. 12, 2009

(86) PCT No.: PCT/SE2009/050730
§ 371 (c)(1),
(2), (4) Date: Mar. 7, 2012

(87) PCT Pub. No.: WO2010/144014
PCT Pub. Date: Dec. 16, 2010

(65) Prior Publication Data
US 2012/0158222 A1     Jun. 21, 2012

(51) Int. Cl.
| G06F 19/00 | (2011.01) |
| G06G 7/70 | (2006.01) |
| G05D 1/06 | (2006.01) |
| G01S 17/02 | (2006.01) |
| G01S 17/88 | (2006.01) |

(52) U.S. Cl.
CPC ............ *G05D 1/0684* (2013.01); *G01S 17/023* (2013.01); *G01S 17/88* (2013.01)

(58) Field of Classification Search
USPC ......................................... 701/16
See application file for complete search history.

(56) References Cited

U.S. PATENT DOCUMENTS

| 4,925,303 A | * | 5/1990 | Pusic | 356/139.03 |
| 4,995,722 A | * | 2/1991 | Sutour | 356/139.03 |
| 5,371,581 A | * | 12/1994 | Wangler et al. | 356/5.01 |

(Continued)

FOREIGN PATENT DOCUMENTS

| EP | 0359663 A1 | 3/1990 |
| EP | 1555545 A1 | 7/2005 |
| WO | WO-2008061307 A1 | 5/2008 |

OTHER PUBLICATIONS

PCT/ISA/210—International Search Report—Mar. 5, 2010.

(Continued)

*Primary Examiner* — Khoi Tran
*Assistant Examiner* — Harry Oh
(74) *Attorney, Agent, or Firm* — Venable LLP; Eric J. Franklin

(57) ABSTRACT

A system arranged in an aerial vehicle for determining the position of the aerial vehicle relative to a center of a remote predetermined landing area arranged on a surface. A beam emitter is configured to emit beams towards the surface. A detector is configured to detect the beams reflected from the surface. A control is configured to control the beam emitter to emit beams onto the surface to form a plurality of lines thereon. A processor is configured to detect at least one edge providing a difference in height relative to the surface based on the detected reflected line forming beams. The edge substantially surrounds the predetermined landing area. The processor is further configured to determine the position of the aerial vehicle relative to the center of the remote predetermined landing area based on the detected at least one edge.

15 Claims, 5 Drawing Sheets

(56) References Cited

U.S. PATENT DOCUMENTS

| | | | |
|---|---|---|---|
| 6,629,023 B1* | 9/2003 | Silder et al. | 701/16 |
| 7,365,652 B2* | 4/2008 | Scherbarth | 340/974 |
| 7,642,929 B1* | 1/2010 | Pinkus et al. | 340/973 |
| 7,650,239 B2* | 1/2010 | Samukawa et al. | 701/300 |
| 7,672,758 B2* | 3/2010 | Astruc | 701/16 |
| 2005/0125142 A1* | 6/2005 | Yamane | 701/200 |
| 2006/0087452 A1* | 4/2006 | Scherbarth | 340/974 |
| 2008/0071431 A1* | 3/2008 | Dockter et al. | 701/3 |
| 2009/0138138 A1* | 5/2009 | Ferren et al. | 701/3 |
| 2011/0307126 A1* | 12/2011 | Hogstrom | 701/16 |
| 2012/0130566 A1* | 5/2012 | Anderson | 701/16 |

OTHER PUBLICATIONS

PCT/ISA/237—Written Opinion of the International Searching Authority—Mar. 5, 2010.

* cited by examiner

CENTERING ABOVE A PREDETERMINED AREA OF A LANDING PLATFORM

CROSS-REFERENCE TO RELATED APPLICATIONS

This application is the national phase under 35 U.S.C. §371 of PCT/SE2009/050730 filed 12 Jun. 2009.

TECHNICAL FIELD

The present invention relates to a system and a method for centering of aerial vehicles above a predetermined area of a surface.

Furthermore, the invention relates to software adapted to perform steps of the centering method when executed on a computer.

BACKGROUND OF THE INVENTION

When landing an aerial vehicle capable of VTOL (Vertical Take Off/Landing), such as an unmanned helicopter, it is important that the aerial vehicle has access to accurate information regarding movement, position and attitude relative to the ground or landing area. In particular, when trying to land on a platform of a ship, the landing process is more difficult since the sea continuously changes the attitude of the ship and the landing platform. Also the fact that the ship is moving in a specific bearing further complicates the landing on the platform. The inclination of the platform is determined by the pitch and the roll, and there is also a movement in the vertical direction. For example, if there is a heavy sea, the amplitude of the waves can change the distance between the ship and the aerial vehicle by quite a large amount. It is important that an accurate prediction of the movements have been made before landing so that the right occasion for landing can be chosen. It is further important that landing can be performed on a predetermined position, at a safe distance from surface structures and the edge of the platform. In the case of an unmanned aerial vehicle UAV, landing can be performed close to an automatic locking device, securing the vehicle to the platform.

U.S. Pat. No. 4,995,722 discloses a helicopter that incorporates means for emitting a conical light beam, and a landing platform on a ship that incorporates photosensitive cells that detect the conical light beam and calculates the attitude of the helicopter. Landing data are displayed based on the calculated attitude, on a panel which the pilot can see in order to land.

A problem with the system according to U.S. Pat. No. 4,995,722 is that it is dependent on sensitive devices placed on the landing platform, such as photosensitive cells or mirrors. The system is further dependant on additional sensitive devices for transmitting landing data wireless from the landing platform to the helicopter in real time.

WO 2008/061307 discloses a method, which has application in the landing of a helicopter by determining the attitude of a remote surface, wherein a laser transceiver is arranged to direct and detect a laser beam by the use of a mirror, which is used to rotate the emitted laser beam in order to trace out a conical surface. The base of the conical surface describes an oval shape on the landing area, and a number of samples are taken at different rotational position. After a complete scan each 3D-point is stored into a buffer in a memory and passed to a software subroutine which calculates the plane of best fit to the stored points. Thereby the future positions of the remote surface can be predicted. This is used in situations such as when the landing platform is a moving deck of a ship. The method further implements a light emitting beacon in combination with a visual tracking sensor to find a predetermined target position on the landing platform.

A problem with the method according to WO 2008/061307 is that if one transmitter for some reason is disabled the whole system is more or less knocked-out. Furthermore, if the helicopter is too high up in the air there is a risk that the tracking cone is too large and misses the landing platform completely. Additional sensitive devices are also required when implementing an emitting beacon together with a visual tracking sensor to find a target position. These additional sensitive devices risk being affected by disturbance from external light sources, such as lanterns, search lights, stars or reflections from the sea surface.

To sum up, there are known methods in the art for measuring inclination and predetermined positions of a remote landing platform. The problems with the systems according to prior art is that they are vulnerable to malfunctions and inflexible to disruptions.

Thus there is a need of a less vulnerable and more flexible arrangement in order to be able to center aerial vehicles above a predetermined area of a surface, such as e.g. a predetermined area on a moving platform of a ship.

OBJECTIVE OF THE INVENTION

It is therefore an objective of the present invention to provide a system, a method and a computer program performing said method, that are less vulnerable to disruptions and more flexible in order to measure the movements of the centre of a predetermined landing area on the platform of e.g. a ship, relative to an aerial vehicle.

SUMMARY OF THE INVENTION

This objective is achieved according to the present invention by a system arranged in an aerial vehicle for determining the position of the aerial vehicle relative to the centre of a predetermined landing area arranged on a surface. The system is suitably mounted in for example an unmanned vehicle (UAV), such as an unmanned helicopter. The system comprises beam emitting means arranged to emit beams towards the surface and detector means arranged to detect the beams reflected from said surface. Control means of the system are arranged to control said beam emitting means to emit beams onto said surface to form a plurality of lines thereon. Processing means of the system are arranged to detect at least one edge providing a difference in height relative to the surface, on basis of the detected reflected line forming beams, wherein said edge substantially surrounds the predetermined landing area. The processing means are further arranged to determine the position of the aerial vehicle relative to the centre of the predetermined landing area, on basis of the detected at least one edge.

By this is achieved a system that use few sensitive devices and that is able to perform measurements on the surface of the landing platform regardless of what conceivable altitude the aerial vehicle is positioned at and regardless of the size of the landing platform. Measuring of the moving platform can start immediately after it has been detected, whereby more of the valuable measuring time can be used for sampling of the edge and/or the surface. The use of a simple geometrical form, involving measured lines for the determination of relative position, inherently leads to low complexity paired with high measurement accuracy.

The system is in one option further characterized in that it comprises beam emitting means comprising at least two beam emitters controlled by the control means.

By this is achieved a less vulnerable system since the system comprises two adjustable beam emitters in case one of them is disabled it is still possible to uphold a functionality in order to complete the landing. The system is also more flexible since the two adjustable beam emitters make it easier to find the platform and start measuring The system is in one option characterized in that it comprises control means arranged to control the beam emitting means to form a plurality of lines on the surface, said lines traversing each other perpendicularly in at least one pair, providing at least one point of intersection and in that the processing means are arranged to determine the position of the aerial vehicle relative to the predetermined landing area, on basis of the detected at least one edge along said traversing lines and said at least one point of intersection.

By this is achieved a measuring of the two dimensions of the landing platform in a cross and wherein the point of intersection should be equal for both the lines and therefore can be used for calibration of the beam emitting means as well as for testing if the beams emitters are fully functional. In addition it makes it easy to find the predetermined landing area since the cross can span a large area.

The system is in one option characterized in that the control means are arranged to control the beam emitting means to form a plurality of lines on the surface, that are parallel to each other and in that the processing means are arranged to determine the position of the aerial vehicle relative to the predetermined landing area, on basis of the detected at least one edge along said parallel lines.

By the use of a plurality of parallel lines it is also possible to measure the inclination of the surface and the position relative to the centre of the predetermined landing area, and if one of the emitting means is disabled the parallel displacement of will give an estimation of the other dimension of the surface.

The system is in one option characterized in that the processing means are arranged to estimate a plane to the surface and determine the position of the vehicle relative to the predetermined landing area on basis of the at least one point of intersection, the at least one detected edge projected and the estimated plane to the surface.

By this is achieved a measuring of the predetermined landing wherein all the measurements are independent of inclinations of the predetermined landing area.

The system is in one option characterized in that it comprises storing means arranged to store distance and angle information about at least some of the detected reflected beams and wherein the processing means further are arranged to on basis of the stored detected reflected beams, to predict a favourable occasion to land on the predetermined landing area, corresponding to a time interval in the future.

By this is achieved is a system that, in addition to determines the position of an aerial vehicle relative to the centre of a predetermined landing area, is also able to predict a favorable occasion for landing centered on e.g. the predetermined landing area of the moving platform of the ship. Said favorable occasion preferably relating to when the pitch and roll of the moving platform as well as the movements in the vertical direction are close to zero.

The system is in one option characterized in that it is arranged to provide control information to a flight control system and/or to a display unit of said aerial vehicle, said control information comprising information about position of the aerial vehicle relative to the centre of the predetermined landing area and/or said time interval in the future, relating to the favourable occasion to land thereon.

By this is achieved is a system that automatically can perform an unmanned landing of an aerial vehicle on a centered position of a predetermined landing area and/or guide an operator of a manned aerial vehicle to land centered on the predetermined landing area.

This objective is also achieved according to the present invention by a method for determining the position of a vehicle relative to the centre of a remote predetermined landing area arranged on a surface, comprising the steps of emitting beams, detecting reflected beams, reflected in said surface, controlling said beams to form a plurality of lines on said surface, detecting at least one edge providing a difference in height relative to the surface, on basis of the detected reflected line forming beams, wherein said edge substantially surrounds the predetermined landing area, determining the position of the aerial vehicle relative to the centre of the predetermined landing area, on basis of the detected at least one edge.

The dependent claims define optional characterizing features corresponding to those described in relation to the system.

This objective is also achieved by a computer programme comprising a programme code for performing the above described method steps, when said computer programme is run on a computer.

This objective is also achieved by a computer programme product comprising a program code stored on a computer readable media for performing the above described method steps, when said computer programme is run on the computer.

This objective is also achieved by a computer programme product directly storable in an internal memory of a computer, comprising a computer programme for performing the above described method steps, when said computer programme is run on the computer.

DETAILED DESCRIPTION

Figure 1:
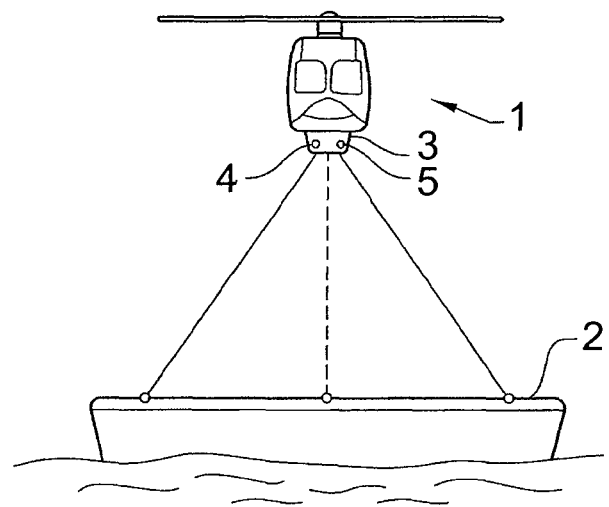
FIG. 1. shows schematically an aerial vehicle hovering above a surface of a landing platform.

FIG. 1 shows an aerial vehicle 1 capable of VTOL, in the present case a helicopter, which has moved into a position above a surface 2 of a landing platform. The landing platform is in one example formed on a ship. The aerial vehicle 1 is equipped with a system 3 for determining the position of the aerial vehicle 1 relative to the centre of a predetermined landing area 14. The system 3 comprises adjustable beam emitters 4, 5. Wherein the beams emitters 4, 5 are arranged adjustably mounted to the body axis coordinate system of the aerial vehicle 1. Thus as the beams from the emitters is adjusted, the beam from each beam emitter is directed to trace out a line on the surface 2, with a predetermined angular relation to said body axis coordinate system of the aerial vehicle 1. In the shown example the system comprises two beam emitters 4, 5 such as at least two adjustable emitters of at least two laser distance meter assemblies. In one example each of the laser distance meter assemblies are capable of measuring up to 150,000 points per second. The system 3 can either be part of a landing aid system in a manned aerial vehicle 1 or part of an autonomous landing system in an unmanned aerial vehicle 1.

Figure 2:
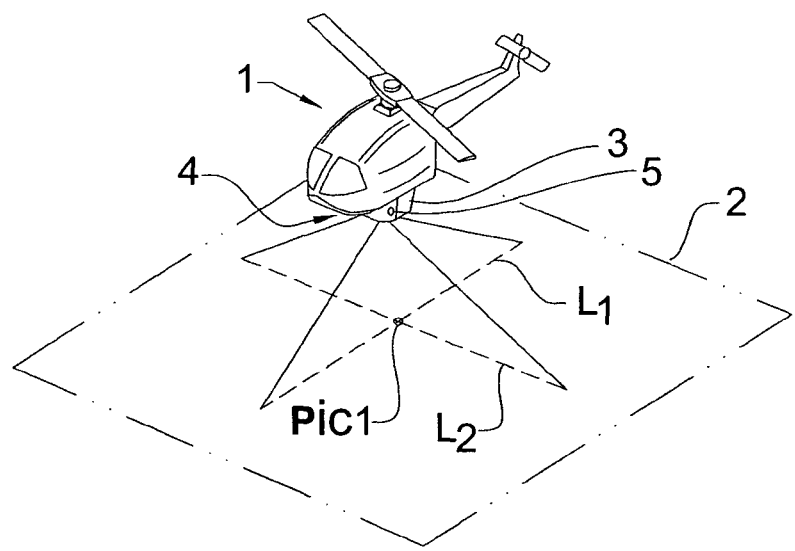
FIG. 2. illustrates schematically how a measuring of the surface of the landing platform is performed by use of a system for centering according to an embodiment of the invention.

In FIG. 2 the beam emitters 4, 5 of the system 3 emit beams in rapid successive order in predetermined angle steps in such a way that spots are projected along straight lines (L1, L2) on the surface 2. The directed movements of the beam emitters are performed in a perpendicular direction to each other so that two straight lines traversing each other are provided. In one example one beam emitter 4 or 5 emit beams in rapid successive order in predetermined angle steps in such a way that spots are projected along straight lines (L1, L2) on the surface 2, so that two straight lines traversing each other are provided. The traversed lines have at least one point of intersection in common Pic1. This point thereby constitutes a control value since the same value should be obtained for each of the lines at the intersection point. This control value can in one example be used for determining if the beams emitters are calibrated and fully functional. The traversing of the lines does not need to be exactly perpendicular as long as one point of intersection is achieved. Each emitted laser beam from the beam emitters is reflected back to the system and can thereby be used for a measurement of the distance between the aerial vehicle 1 and that particular point on the surface 2. Between the reflections the beam emitters are adjusted into their next angle position, and thus both the angle and the distance can be determined.

Figure 3:
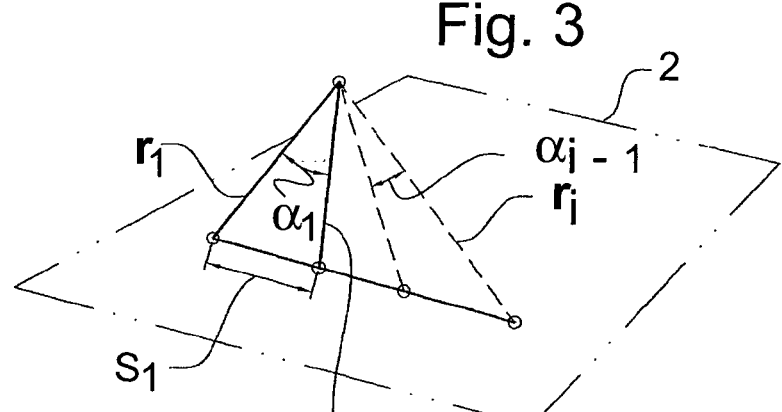
FIG. 3. illustrates schematically in more detail how the measuring of the surface of the landing platform is performed by using the system for centering according to an embodiment of the invention.

In FIG. 3 the measuring principle is based on distance and angle of beams reflected from the surface 2. If one considers two successive measured points on the surface 2 in a series of successive measurements along a line, the distances from the beam emitters above to each of the two points on the surface are known (r1, r2) by the time the beam has been reflected back to the system 3, and so is the angle $\alpha_1$ between the imagined lines to these two points (i.e. a laser beam to each point of the two). Since these parameters are known the distance between the two points on the surface 2 can be calculated. This distance on the surface (i.e. a first segment S1 of the line), and the distances (r1, r2) from the surface 2 to the beam emitters above all together constitute an imagined triangle. Since all the successive distances $r_i$ and angels $\alpha_{i-1}$ for each beam emitters are known, then each line on the surface, or more thoroughly, all the segments that constitute each line, are also known. This could either be done by means of trigonometry, as briefly discussed above, by numerical methods (e.g. robust transforms such as the Hough-transform for line detection followed by robust regression such as iterative least squares fit for line equation estimation), or in some other way known in prior art. It is also possible that the movement of each laser is continuous instead of moving in a series of successive steps, and hence the angle will be proportional to the movement during a time interval.

The system performs a complete traverse-line measurement almost instantly of the surface of the landing platform. By processing these measurements it is possible to estimate the equation of a plane of best fit to the surface at that instant, by e.g. a least square method, and from these equations the altitude and the vertical movement, the pitch and roll angle, as well as the angular velocity and angular acceleration of the pitch and roll angles, respectively, could be determined. By repeating the procedure of estimating the equation of the plane for each instant traverse-line measurement during a time interval, it will be possible to get enough measurement data to predict how the platform will move in a near future. The length of the time interval, before a command to land the helicopter is given, could be determined either when a periodic move-pattern of the platform has been found, or when some conditions of a predetermined wave equation model have been fulfilled. This model could be a more generally applicable wave equation model, or a specific wave equation model for each type of sea vessel. In order to consecutively estimate the equation of the plane more accurate a Kalman filter, a least square fit and/or a rejection function may be used in combination with these equations.

Figure 4:
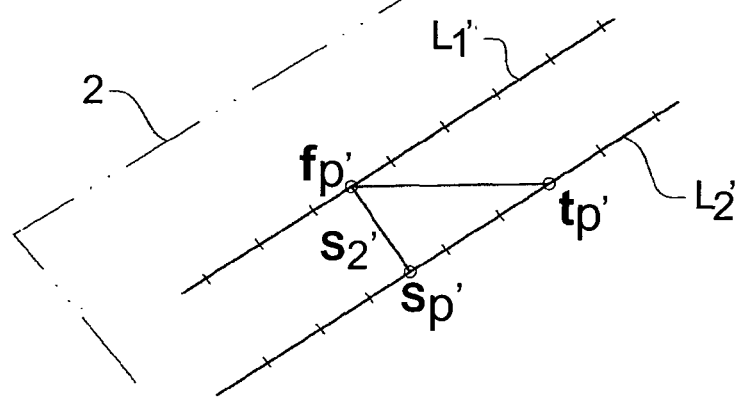
FIG. 4. illustrates schematically in further more detail how a measuring of the surface of the landing platform is performed according to an embodiment of the invention using parallel lines.

In one example a plurality of parallel lines are projected on the surface 2. This could be achieved by a slight adjustment of one or each beam emitter 4 and 5, between each consecutive line measurements. This also makes the measuring of the surface 2 more robust in the way that even if one of the beam emitters is knocked-out, or disabled, the parallel displacement of two straight lines gives at least a minimal estimation of a distance in another dimension on the surface 2 than the dimension given by the parallel straight lines, and hence some information about the inclination of the landing platform in the other dimension of the surface 2 is achieved. If one considers a scenario where two parallel straight lines are projected on the surface 2, as can be seen in FIG. 4 the distance and the direction between a first point fp' in the first line L1' and a second point sp' in the second line L2' could be determined. Preferably points that are closest to each other in the two displaced parallel lines are chosen, and a corresponding distance S2' between them calculated. This distance S2' hence becomes perpendicular to each of the lines and provides a measurement in the second dimension of the surface 2. It is also possible to pair other points from the parallel lines as well, which do not form a perpendicular distance in respect of the parallel lines. In one example the first point fp' in the first line L1' and a third point tp' in the second line L2' are paired. Alternatively, in one example the information about the inclination of the surface 2 is determined by means of robust regression on basis of the displaced parallel lines or other methods known in the art. The use of a plurality of parallel lines also makes it possible to determine the evenness of the surface 2, which could be an advantage if the surface 2 of the landing platform contains hindrance such as for example surface structures.

Figure 5:
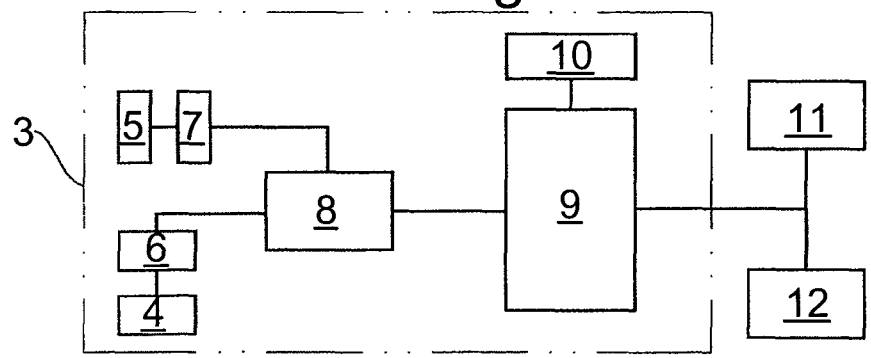
FIG. 5. is a block diagram showing the system for centering according to the embodiments in FIG. 2, FIG. 3, FIG. 4, FIG. 6 or FIG. 7 of the invention.

In FIG. 5 a centering system 3 according to one example is shown. It comprises a first beam emitter 4 and a second beam emitter 5. Each of the beam emitters transmits a laser beam. The first beam emitter 4 is controlled by a first control device 6, and the second beam emitter 5 is controlled by a second control device 7. The control devices may be electrical motors/or step motors. The reflected laser beams are detected by a detector 8 and these measurements are further converted into encoded by means of an encoder signals so that the measurements can be related to the body axis coordinate system of the aerial vehicle 1. In one example each beam emitter have its own detector arranged to detect the reflected laser beams, for example, either by a difference in wavelength or by emitting the pulses in a specific order. In one example the beam emitter (4, 5), detector 8 and control device (6, 7) is comprised in a laser distance meter assembly. In another example the beam emitters and corresponding detector and or detectors are arranged to perform distance measurements on basis of interferometry or other known methods in the art. The measurements regarding distance and corresponding angle are then communicated to and processed by processing device 9. The system may also comprise a memory storage device 10 for storing the processed and/or unprocessed detected reflected beams. The memory storage device 10 may also be arranged to store other type of information such as for example the wave equation models for later use by the processing device 9.

Figure 6:
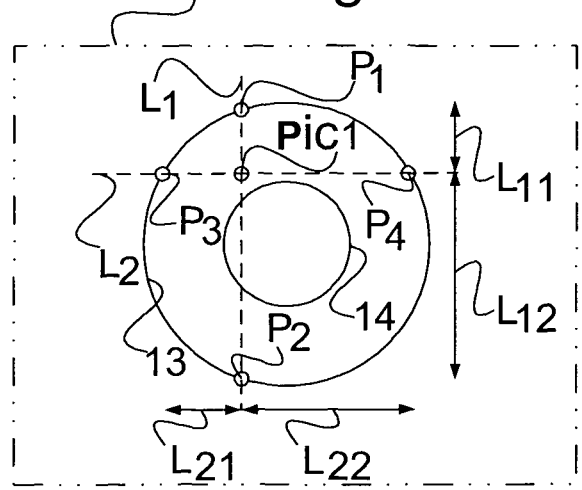
FIG. 6. illustrates schematically how the position of the aerial vehicle relative to the predetermined landing area is determined according to an embodiment of the invention.

FIG. 6 illustrates schematically an example of a principle of determining the position of the aerial vehicle 1 relative to the centre of a predetermined landing area 14. The aerial vehicle 1 is positioned above the surface 2. The beam emitters (4, 5) emit beams along two lines (L1, L2) on the surface 2 forming a traversed line pattern thereon. The processing device 9 is arranged to detect positions (P1, P2, P3, P4) among adjacent positions along each of the lines (L1, L2) on the surface 2, that provides a difference in height relative to the surface 2. The positions (P1, P2, P3, P4) are detected on basis of processing detected beams from the beam emitters reflected from the surface 2.

The difference in height is provided by an edge 13 substantially surrounding the predetermined landing area 14 on the surface 2. The difference in height detectable by the processing device 9 lies in one example within the range 1 to 50 cm, for example within the range 10 to 30 cm, such as approximately 15 cm.

The edge 13 is shaped so as to be arranged to allow unambiguous determination of a centre point. In one example the edge 13 form a circle. The edge 13 is in one example arranged substantially equidistant from the centre of the predetermined landing area 14.

Figure 7:
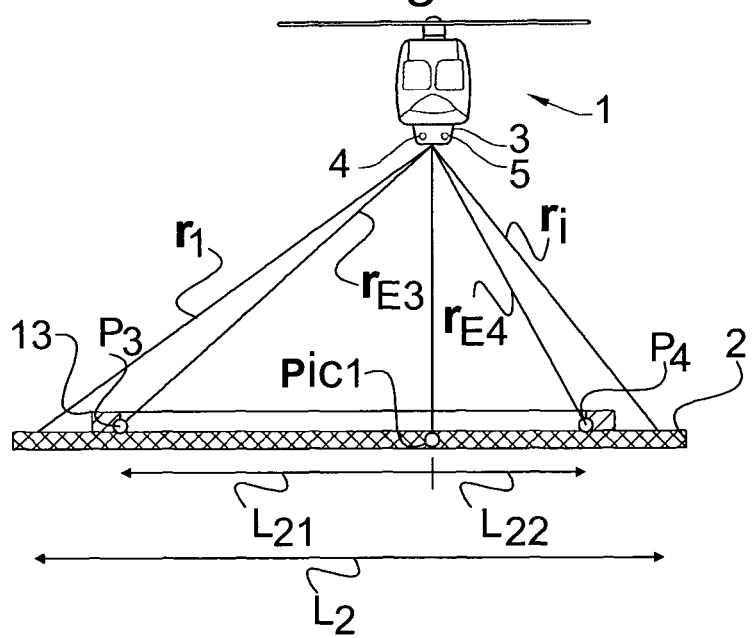
FIG. 7. shows schematically an aerial vehicle hovering above a surface determining its position relative to the centre of a predetermined landing area, viewed in a vertical cross-section, according to an embodiment of the invention.

FIG. 7 illustrates schematically an example of how the position of the aerial vehicle 1 relative to the centre of the predetermined landing area 14 is determined in one dimension.

A set of distances $r_1$ to $r_i$ is formed related to each line (L1, L2). Each distance represents the detected distance between the reflection and the detector 8. Each distance is associated to a corresponding angle. In one example the distances $r_1$ to $r_i$ corresponds to the distances between the aerial vehicle 1 and specific points on the surface along the line L2, defined by the predetermined angle steps. The processing device 9 is arranged to process the all the distances $r_1$ to $r_i$ to detect differences in distance between adjacent positions on the surface along the line L2, corresponding to adjacent positions on the surface where the height differ substantially such as where the edge 13 is arranged. In one example, the processing device 9 is arranged to apply a first tolerance condition, adapted to the dimension of the edge 13. The first tolerance condition determine whether a detected height difference relates to the edge 13 or to positions falling outside of the surface 2 and/or positions relating to other surface structures. In one example a second tolerance condition is applied, relating to whether the surface 2 along at least one of the lines (L1, L2) within the detected edge 13 is substantially planar. Accordingly, the system 3 can discriminate the edge 13 from other detected height differences. Since the beam emitters (4, 5) emit successive beams in small predetermined angle steps towards the surface 2, the processing device 9 will be able to exclude height differences between adjacent positions on the surface 2 caused by inclination of the surface 2 and/or aerial vehicle 1.

In the shown example the processing device 9 detects within the set of distance measurements $r_1$ to $r_i$ belonging to the line L2, that a first distance $r_{E3}$ and a second distance $r_{E4}$ both differ substantially from measurements adjacent of the first and second distances respectively. The processing device 9 is also in one example arranged to verify that both fall within the tolerance conditions. These distances $r_{E3}$ and $r_{E4}$ are thereby determined by the processing device 9 to relate to positions P3 and P4 on the surface 2, where the line L2 intersect the edge 13. The above described procedure can be repeated for the line L1 to obtain positions P1 and P2. The positions P1 and P2 correspond to positions along the line L1 where the edge 13 is detected. In one example the above described procedure is repeated for each instant consecutive line measurement performed by the system 3 on the surface 2.

In one example the processing device 9 is arranged to determine two sets of line sub segments (L11, L12) and (L21, L22), one set for each line L1 and L2 on the surface 2. Each line sub segment is a respective line between the positions P1 to P4 where the edge 13 is detected along the lines (L1, L2) to the point of intersection Pic1. L11 is a first sub segment of the line L1 from the position P1 to the point of intersection Pic1, L12 is a second sub segment of the line L1 from the point of intersection Pic1 to the position P2, L21 is a first sub segment of the line L2 from the position P3 to the point of intersection Pic1, and L22 is second a sub segment of the line L2 from the point of intersection Pic1 to the position P4. The two sets of line sub segments (L11, L12) and (L21, L22) are determined by for example means of trigonometry based on that all successive distance and angles between the aerial vehicle 1 and the position P1 to P4 and Pic1 are known by the system 3. This procedure was described in greater detail with reference to FIG. 3.

In one example the processing device 9 is arranged to determine the position of the aerial vehicle 1 above the surface relative to the centre of the predetermined landing area 14, on basis of each of the determined two sets of line sub segments (L11, L12) and (L21, L22). Since the lines (L1, L2) on the surface 2 origins from the body axis coordinate system related to the aerial vehicle 1, the relation i.e. difference in length between the first sub segment L11 and the second sub segment L12 of the line L1 as well as the difference in length between the first sub segment L21 and the second sub segment L22 of the line L2 determine in which direction the aerial vehicle 1 should reposition itself, to be able to reach a position centered above the predetermined landing area 14.

To determine in which direction the aerial vehicle 1 should reposition itself in to achieve a position centered above the predetermined landing area 14, the processing device 9 are in one example arranged determine said direction on basis of information about the orientation of the aerial vehicle 1 and the following conditions:

$L_{11}<L_{12}$ Correspond to reposition the aerial vehicle backwards.

$L_{12}<L_{11}$ Correspond to reposition the aerial vehicle forwards.

$L_{21}<L_{22}$ Correspond to reposition the aerial vehicle to the right.

$L_{22}<L_{21}$ Correspond to reposition the aerial vehicle to the left.

According to an example the processing device 9 is arranged to evaluate boundary conditions to determine if the aerial vehicle 1 is within a certain predetermined distance to the centre of the predetermined landing area 14. The boundary conditions are described by the following two mathematical expressions:

$$L_{11}+L_{12}>2r-z$$

$$L_{21}+L_{22}>2r-z$$

The parameter z represents the diameter of the predetermined landing area 14 and r is the radius of the edge 13 surrounding the predetermined landing area 14. The diameter z lies in one example within the range of 0.5 to 6 m, for example within the range 1 to 4 m, such as approximately 2 m. The use of the boundary conditions to determine the position of the aerial vehicle 1 relative to the predetermined landing area 14 makes a centering procedure possible using fewer control commands to correct the position of the aerial vehicle 1.

If the attitude of the surface 2 is varying, such as in a case wherein the surface is situated on a platform of a ship, the above described procedure to determine the position of the aerial vehicle 1 relative to the predetermined landing area 14, is in one example complemented with the information discussed in relation to FIG. 3, regarding the estimated plane to the surface 2. Thereby parameters such as z will be independent of the pitch and roll of the ship.

It could occur that the aerial vehicle 1 hovers above the surface 2, at a position such that one of the traversed lines (L1, L2) intersects the edge 13. Then the processing device 9 is unable to detect the edge 13 along the other line. The information relating to detected distances and angles from the positions (P1, P2) or (P3, P4) calculated for the line that intersects the edge 13 and the corresponding intersection point Pic1 could then be used by the processing device 9 to determine in which direction the aerial vehicle 1 need to reposition itself such that the other line intersects the edge 13. Said direction corresponding to a direction represented by a vector from the position of Pic1 to the positions (P1, P2) or (P3, P4) that intersects the edge 13. This will enable the traverse line measurements according to the examples described with reference to FIG. 6 and FIG. 7.

In one case when the aerial vehicle 1 hovers above the surface 2 at a position such that none of the traversed lines (L1, L2) intersects the edge 13. This is corresponding to a situation wherein the processing device 9 is unable to detect an edge 13 along any of the lines (L1, L2). The processing device 9 is in one example arranged to issue a control command to the aerial vehicle 1, relating to a yaw motion until the processing device 9 detects the edge 13 along one of the lines (L1, L2). The processing device 9 is in another example arranged to issue a control command to the aerial vehicle 1, relating to a alternating backward and forward motion until the processing device 9 detects the edge 13 along one of the lines (L1, L2). The processing device 9 is in yet another example arranged to issue a control command to the aerial vehicle 1, relating to an alternating left and right motion until the processing device 9 detects the edge 13 along one of the lines (L1, L2). Thereafter the above described procedure relating to determining in which direction the aerial vehicle 1 need to reposition itself when the edge 13 is detected along one of the lines (L1, L2) is followed.

In one example, the processing device 9 is arranged to determine the position of the aerial vehicle 1 relative to the predetermined landing area 14 on basis of a plurality of parallel lines. The beam emitters are then controlled by means of the control device 6 or 7 to emit at least one central line, followed by two further flanking lines, displaced in parallel on each side of the central line on the surface 2, as shown in greater detail with reference to FIG. 4. The processing device 9 may then be arranged to issue control commands to the flight control system of the aerial vehicle 1. These control commands relate to reposition the aerial vehicle 1, in a perpendicular direction towards the flanking line determined by the processing device 9 to have the largest distance between the detected positions of an edge 13. When the processing device 9 detects that the distance between the positions where the edge 13 is detected along the central line, is larger than the distance between the positions where the edge 13 is detected along each of the two flanking lines. Then, the aerial vehicle 1 is determined by the processing device 9 to be centred above the predetermined landing area 14 in the direction perpendicular to the plurality of parallel lines. The information relating to detected distances and angles from the positions where the central line intersects the edge 13 could be used by the processing device 9 to determine in which direction the aerial vehicle 1 need to reposition itself such that it obtains the centered position in the direction parallel to the plurality of the parallel lines. This also makes the measuring of the centre of the predetermined landing area 14 more robust in the way that even if one of the beam emitters is knocked-out, or disabled In yet another example of the invention, the processing device 9 is arranged to determine the position of the aerial vehicle 1 relative to the predetermined landing area 14 on basis of detected reflected beams along the at least one central line on the surface 2, complemented by information about the dimension of the edge 13. The processing device 9 may then be arranged to issue control commands to the flight control system of the aerial vehicle 1. These control commands relate to reposition the aerial vehicle 1, in a perpendicular direction towards the at least one central line, until the distance between the detected positions of the edge 13 along the at least one central line is determined to be close to the diameter of the edge 13. The information relating to detected distances and angles from the positions where the at least one central line intersects the edge 13 could be used by the processing device 9 to determine in which direction the aerial vehicle 1 need to reposition itself such that it obtains a centered position in the direction parallel to the at least one central line.

In one example information about the dimension of the edge 13 is preloaded into the memory storage device 10. In another example the information about the dimension of the edge 13 is communicated to a receiving device 12 of the aerial vehicle 1 before initiation of the centering procedure for use in centering the aerial vehicle 1.

In one example the predetermined landing area 14 is located outside the centre of gravity of the surface 2 such as outside on the centre of gravity of a ship. The processing device 9 is then in one example arranged to trigger measurements of the position aerial vehicle 1 relative to the centre of the predetermined landing area 14, when pitch or roll of the surface 2 is estimated by the processing device 9 to be close to zero. The measurements could be performed according to any of the above described measurement procedures for measurement of the position aerial vehicle 1 relative to the centre of the predetermined landing area 14. Alternatively the processing device 9 is arranged to over a time interval continuously determine and store the position of the aerial vehicle 1 relative to the centre of the predetermined landing area 14. Said determination could be performed by the system 3 on basis of any of the above described measurement procedures. The processing device 9 could thereby determine the position of the aerial vehicle 1 relative to the centre of the predetermined landing area 14 on basis of an estimated mean value over time. The process of estimating the mean value over time of the centre of the predetermined landing area 14 may in one example involve implementing a minimum mean square estimator (MMSE), or other methods known in the art, to the measurements provided by the system 3 complemented by a stored model of the wave equation. This model could be a more generally applicable wave equation model, or a specific wave equation model for each type of sea vessel.

The processing device 9 is arranged to detect the edge 13, protruding from or recessed in the surface 2. The edge 13 detectable by the processing device 9 comprises in one example at least one slit, ring, border, tube or disc, providing a difference in height relative to the surface 2.

Figure 8:
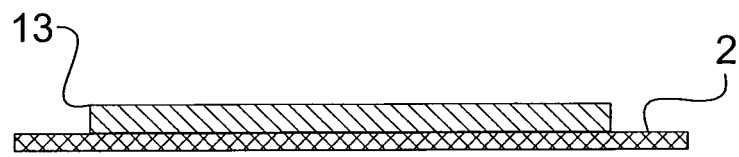
FIG. 8. illustrates schematically an edge shaped as a disc arranged on a surface, viewed in a vertical cross-section, according to an embodiment of the invention.

FIG. 8 illustrates an example of an edge 13 detectable by the processing device 9, arranged on the surface 2, viewed from a vertical cross-section. In this example the edge 13 is disc shaped and arranged on the surface 2. In another example the ring shaped edge 13 is recessed in the surface 2.

Figure 9:
FIG. 9. illustrates schematically an edge shaped as a toroid arranged on a surface, viewed in a vertical cross-section, according to an alternate embodiment of the invention.

FIG. 9 illustrates an example of an edge 13 detectable by the processing device 9, arranged on the surface 2, viewed from a vertical cross-section. In this example the edge 13 is a toroidal tube arranged on the surface 2, held on place on the surface 2 by its own weight or alternatively attached to the landing platform by attachment means arranged on the surface 2 and/or on the toroidal tube.

In another example the toroidal tube is filled with a filling material, of a density sufficient to hold said tube on place by the force of friction on the surface 2, while the surface 2 is suppressed to movements in pitch and roll. In a further example the toroidal tube is made out of synthetic textile. In yet another example the toroidal tube is arranged to be inflatable and is secured to the surface 2 by means of first attachment means such as straps arranged on the inflatable toroidal tube, wherein the first attachment means is secured to the surface 2 by means of second attachment means such as bolted clips or loops arranged on the surface 2.

Figure 10:
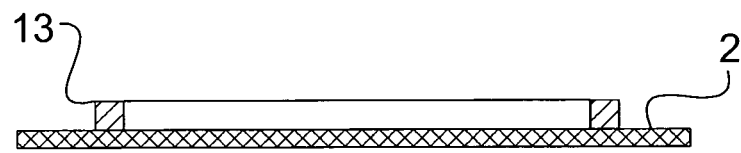
FIG. 10. illustrates schematically an edge shaped as a ring arranged on a surface, viewed in a vertical cross-section, according to yet another embodiment of the invention.

FIG. 10 illustrates an example of an edge 13 detectable by the processing device 9, arranged on the surface 2, viewed from a vertical cross-section. In this example the edge 13 is ring shaped and arranged on the surface 2. In another example the ring shaped edge 13 is recessed in the surface 2 and thereby form a slit in said surface 2. In yet another example the edge 13 forms at least one ring protruding from or recessed in the surface 2.

The processing device 9 is in one example, relating to FIG. 9. or FIG. 10. arranged to detect additional positions of the edge 13 along the lines (L1, L2). Said additional positions correspond to the height differences provided by both the inner and outer diameter of the edge 13. These additional positions of the detected edge 13 complemented by information dimension of the edge 13 can be used by the system 3 to determine whether a detected height difference relate to the edge 13.

In one example at least one alignment marker is arranged on a predetermined position along the contour of the edge 13, for use in aligning the aerial vehicle 1. The alignment marker is in one example arranged on at least one predetermined position on the edge 13, providing a difference in height and/or thickness relative to the edge 13. In another example the alignment marker is arranged on the surface 2, next to or near the edge 13, providing a difference in height relative to the surface 2. In one example the alignment marker is a recession in or protrusion on the edge 13. In yet another example the alignment marker is a recession in or protrusion on the surface 2, next to or near the edge 13. The processing device 9 is according to an example of the invention arranged to detect a difference in thickness and/or height relative to the edge 13 or alternatively to detect a difference in height relative to the surface 2, near or next to the edge 13. This procedure relating to detecting differences in height and/or thickness is performed in a similar fashion as the procedure for detecting differences in height described in more detail with reference to FIG. 6 and FIG. 7. In one example the processing device 9 is arranged to issue control commands to the flight control system of the aerial vehicle 1 related to performing a rotation around its vertical axis i.e. performing a yaw motion, until the at least one alignment marker is detected. This makes it possible to align the aerial vehicle 1 in a predetermined yaw direction. This procedure can be repeated during each instant line measurement.

By implementing the procedure described in relation to FIG. 3 or FIG. 4 describing the prediction of how the surface 2 will move in the future based on measurements as well as the one of the above described procedures for determining the position of the aerial vehicle 1 relative to the predetermined landing area 14. It will be possible to issue control commands to a flight control system of the aerial vehicle 1 relating to the position of the aerial vehicle 1 relative to the centre of the predetermined landing area 14 and/or the moment when the surface of the predetermined landing area 14 is predicted to become horizontal, i.e. pitch and roll are close to zero. This will enable the aerial vehicle 1 to land safely centered on the predetermined landing area 14. It will also be possible to land the aerial vehicle 1 close to an automatic locking device arranged on the predetermined landing area 14 so as to automatically secure the aerial vehicle 1 to the surface 2. Alternatively, the information regarding the predetermined landing area 14 and the moment in time when the surface of the landing platform is predicted to become horizontal could be further processed by the processing device 9 and thereafter presented on a display unit as a visual landing aid for an operator of aerial vehicle 1.

Information regarding the movement, position and attitude of the UAV from e.g. sensors such as GPS (for example longitude, latitude, heading), inertial sensors, accelerometers and gyroscopes in 11 could in one example be used together with the measurements of the surface in the system to reposition the aerial vehicle 1 to a position centered above the predetermined landing area 14, to be able to land thereon. This may be achieved by processing all these measurements in the processing device 9. Information regarding the movement, position and attitude of the ship and thereby its landing platform may be received in the receiving device 12. The information could for example comprise GPS-data transmitted from the ship to the aerial vehicle 1 during in flight to the platform, or during the landing on the platform.

In one example the processing device 9 comprises a non-volatile memory, a data processing device such as a microprocessor and a read/write memory. The non-volatile memory has a first memory portion wherein a computer program, such as an operating system, is stored for controlling the function of the system 3. Further, the processing device 9 comprises a bus controller, a serial communication port, I/O-means, an A/D-converter, a time date entry and transmission unit, an event counter and an interrupt controller. The non-volatile memory also has a second memory portion.

A computer program comprising routines for controlling the system 3 of an aerial vehicle 1 is provided. The program may be stored in an executable manner or in a compressed state in a separate memory and/or in the read/write memory.

When it is stated that the data processing device performs a certain function it should be understood that the data processing device performs a certain part of the program which is stored in separate memory, or a certain part of the program which is stored in read/write memory.

The data processing device may communicate with a data port by means of a first data bus. The non-volatile memory is adapted for communication with the data processing device via a second data bus. The separate memory is adapted to communicate with data processing device via a third data bus. The read/write memory is adapted to communicate with the data processing device via a fourth data bus.

When data is received on the data port it is temporarily stored in the second memory portion. When the received input data has been temporarily stored, the data processing device is set up to perform execution of code in a manner described above. According to one example, data received on the data port comprises information regarding the detected reflected beams from the detector device (6, 7) and/or from the memory storage device 10. This information can be used by the processing device 9 so as to determine the position of the aerial vehicle 1 relative to the centre of the predetermined landing area 14, and/or to issue control commands to the flight control system and/or display unit of the aerial vehicle 1, relating to reposition the aerial vehicle 1 so as to reach a position centred above the predetermined landing area 14 and/or to land thereon on a favourable occasion, as described above.

Figure 11:
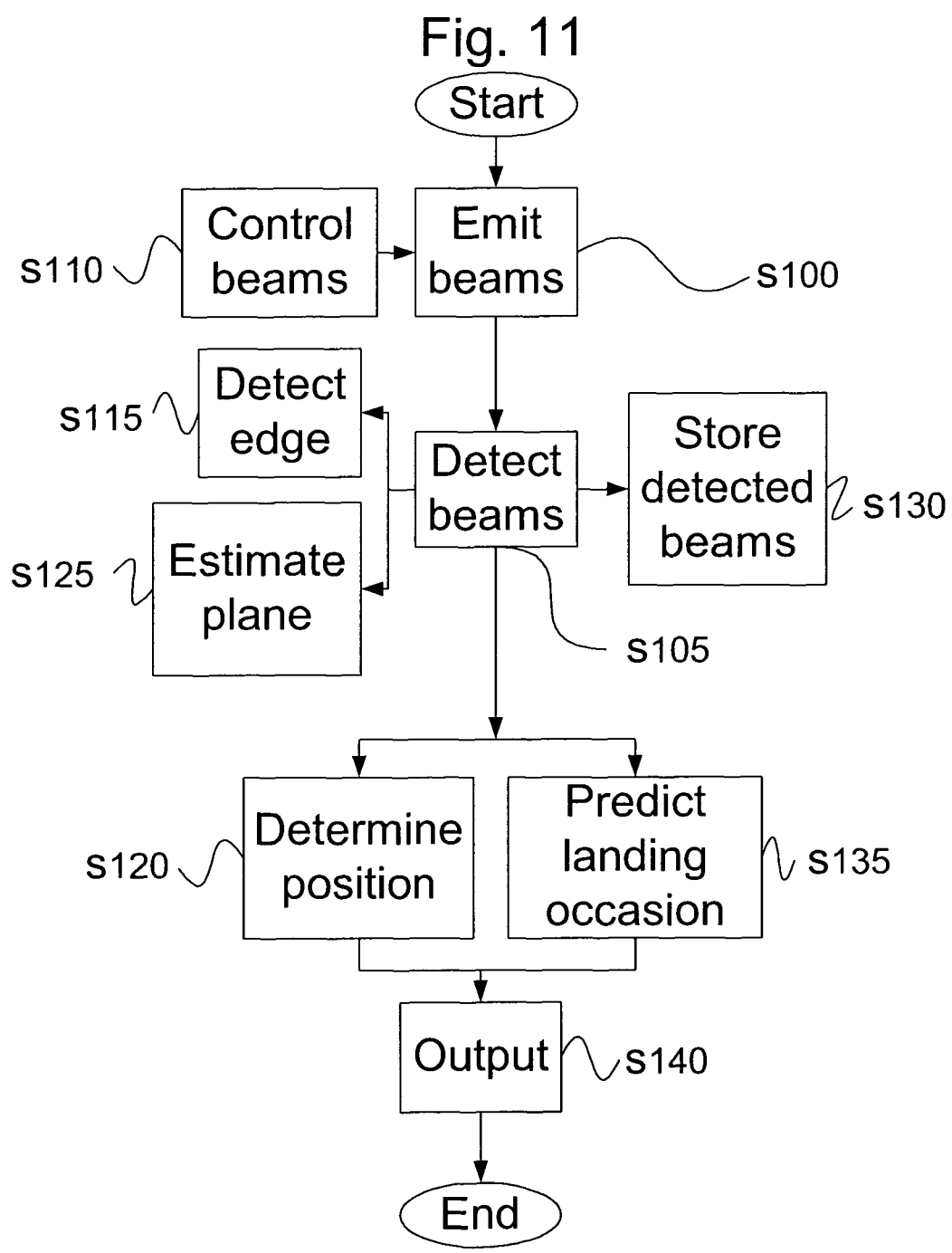
FIG. 11. shows a schematic flow chart over a centering method according to one example of the present invention.

An aspect of the invention relates to a computer programme comprising a programme code for performing the method steps depicted with reference to FIG. 11, when the computer programme is run on a computer.

An aspect of the invention relates to a computer programme product comprising a program code stored on computer-readable media for performing the method steps depicted with reference to FIG. 11, when the computer programme is run on the computer.

An aspect of the invention relates to a computer programme product directly storable in an internal memory of a computer, comprising a computer programme for performing the method steps depicted with reference to FIG. 11, when the computer programme is run on the computer.

FIG. 11 schematically illustrates an example of a centering method. This example relates to determine the position of an aerial vehicle 1 relative to the centre of a predetermined landing area 14 so as to reach a position centred above the predetermined landing area 14 and/or to land thereon.

In a first method step s100 beams are emitted, i.e. emitted from the beam emitters (4, 5). The beam emitters (4, 5) are explained in more detail above, for example with reference to FIG. 2. After the method step s100 a subsequent method step s105 is performed.

In the method step s105 beams reflected from the surface 2 are detected. After the method step s105 a subsequent method step s110 is performed.

In the method step s110 the beam emitters are controlled to be adjusted in successive predetermined angle steps to emit beams forming a plurality of lines on the surface 2. Between each successive predetermined angle step the procedure performs the method in step s100 and s105. This procedure is explained in greater detail above, for example with reference to FIG. 2. After the method step s110 are finished and a plurality of lines has been formed, a subsequent method step s115 is performed.

In the method step s115 at least an edge is detected on basis of processing the detected reflected beams. This procedure is explained in greater detail above, for example with reference to FIG. 6 and FIG. 7. After the method step s115 a subsequent method step s120 is performed.

In the method step s120 the position of the aerial vehicle 1 relative to the centre of the predetermined landing area 14 is determined on basis of the at least one detected edge 13. After the method step s120 a subsequent method step s125 is performed in the illustrated example.

In the method step s125 a plane to the surface 2 is estimated on basis on the detected reflected beams. As explained in greater detail with reference to FIG. 3 and FIG. 4. After the method step s125 a subsequent method step s130 is performed in the illustrated example.

In the method step s130 the detected reflected beams are stored in memory storage device 10 to provide basis for a prediction of a favourable occasion to land. After the method step s130 a subsequent method step s135 is performed in the illustrated example.

In the method step s135 a favourable landing occasion to land centred on the predetermined landing area 14 is predicted, corresponding to a time interval in the future when the pitch and roll of the predetermined landing area 14 is predicted to be close to zero, on basis of the stored detected reflected beams. This procedure is explained in more detail with reference to FIG. 3. After the method step s135 a subsequent method step s140 is performed in the illustrated example.

In the method step s140 control commands is provided to a flight control system and/or display unit of the aerial vehicle 1. The control commands relates in one example to reposition the aerial vehicle 1 so as to reach a position centred above the predetermined landing area 14 and/or to a favourable occasion to land on the predetermined landing area 14. After the method step s140 the method is repeated to perform a new traversed or parallel line measurement in order to continuously determine the position of the aerial vehicle 1 relative to the centre of the predetermined landing area 14, alternatively the method ends if the aerial vehicle 1 has completed landing.

It is by the invention achieved a more flexible, robust and cost efficient system with a higher system safety. If, for example, one of the beam emitters is knocked-out, or disabled, it is still possible to estimate the inclination in at least one dimension and determine the position of the aerial vehicle relative to the predetermined landing area. By the use of the measurement method of the present invention, in which the system operates at, it is possible to perform measurements on the surface of the landing platform regardless of what conceivable altitude the aerial vehicle is positioned at and regardless of the size of the landing platform. This gives the advantage that an estimation of the moving platform can start immediately after it has been detected, whereby more of the valuable measuring time can be used for sampling on the surface. By the use of the simple geometrical form, wherein measured straight and traversed lines are used for the estimation, this inherently leads to less complexity paired with higher measurement accuracy. Although the memory storage and processing capacity nowadays have increased, the use of simple geometry is not unessential, since the amount of measurement data could be very large which in turn affects the processing time and thereby also the choice regarding specification of components.

The system, method and software adapted to perform the method are not restricted to a landing platform of a ship, but it could be any other type of moving surface and in another environment as well. The movements could also be slow or rapid.

The described examples can be modified without leaving the scope of invention, for example could the beam emitters be other kind of devices than laser distance meters, which emit beams in other frequencies of the electromagnetic spectrum

The invention claimed is:

1. A system arranged in a vertical take-off and landing aerial vehicle for determining a position of the aerial vehicle relative to a center of a remote predetermined landing area arranged on a surface, the system comprising:
   a beam emitter configured to emit beams towards the surface;
   a detector configured to detect the beams reflected from said surface;
   a control unit configured to control said beam emitter to emit beams onto said surface to form a plurality of intersecting lines thereon; and
   a processor configured to detect at least one edge providing a difference in height of the edge relative to the surface, based on the detected reflected line forming beams, wherein said edge substantially surrounds the predetermined landing area, and wherein the processor is further configured to determine the position of the vertical take-off and landing aerial vehicle relative to the center of the predetermined landing area based on the detected at least one edge.

2. The system according to claim 1, wherein the beam emitter comprises at least two beam emitters controlled by the control unit.

3. The system according to claim 1, wherein the control unit is configured to control the beam emitter to form a plurality of lines on the surface, said lines traversing each other perpendicularly in at least one pair, providing at least one point of intersection, and where in the processor is configured to determine the position of the aerial vehicle relative to the center of the remote predetermined landing area based on the detected at least one edge along said traversing lines and said at least one point of intersection.

4. The system according to claim 1, wherein the control unit is configured to control the beam emitter to form a plurality of lines on the surface that are parallel to each other, and wherein the processor is configured to determine the position of the aerial vehicle relative to the center of the predetermined landing area based on the detected at least one edge along said parallel lines.

5. The system according to claim 3, wherein the processor is further configured to estimate a plane to the surface and determine the position of the vehicle relative to the predetermined landing area based on the at least one point of intersection and the at least one detected edge and the estimated plane to the surface.

6. The system according to claim 1, further comprising:
   a storage unit configured to store distance and angle information about at least some of the detected reflected beams, wherein the processor is further configured to predict based on the stored detected reflected beams, a favourable occasion to land on the predetermined landing area corresponding to a time interval in the future.

7. The system according to claim 1, wherein the system is configured to provide control information to at least one of a flight control system or to a display unit of said aerial vehicle, said control information comprising information about at least one of position of the aerial vehicle relative to the center of predetermined landing area or said time interval in the future, relating to the favorable occasion to land thereon.

8. A method for determining a position of a vertical take-off and landing aerial vehicle relative to a center of a predetermined landing area arranged on a surface, the method comprising:
   emitting beams;
   detecting reflected beams, reflected in said surface;
   controlling said beams to form a plurality of intersecting lines on said surface;
   detecting at least one edge providing a difference in height of the edge relative to the surface based on the detected reflected line forming beams, wherein said edge substantially surrounds the predetermined landing area; and
   determining the position of the vertical take-off and landing aerial vehicle relative to the center of the predetermined landing area based on the detected at least one edge.

9. The method according to claim 8, further comprising:
   controlling simultaneously at least two beams to from a plurality of lines on the surface.

10. The method according to claim 8, further comprising:
    controlling said beams to form a plurality of lines on the surface, said lines traversing each other perpendicularly in at least one pair, providing at least one point of intersection.

11. The method according to claim 8, further comprising:
    controlling said beams to form a plurality of lines on the surface that are parallel to each other.

12. The method according to claim 10, further comprising:
    estimating a plane to the surface and determining the position of the vehicle relative to the center of the predetermined landing area based on the at least one point of intersection and the at least one detected edge and the estimated plane to the surface.

13. The method according to claim 8, further comprising:
    storing distance and angle information about at least some of the detected reflected beams and predicting based on the stored detected reflected beams a favorable occasion to land centered on the remote predetermined landing area corresponding to a time interval in the future.

14. The method according to claim 8, further comprising:
    providing control information to at least one of a flight control system or to a display unit of said vehicle, said control information comprising information about at least one of position of the aerial vehicle relative to the center of predetermined landing area or said time interval in the future, relating to the favorable occasion to land thereon.

15. A computer program product, comprising:
    a non-transitory computer readable medium; and
    computer program instructions recorded on the computer readable medium and executable by a processor for performing a method for determining a position of a vertical take-off and landing aerial vehicle relative to a center of a predetermined landing area arranged on a surface, the method comprising:

emitting beams;

detecting reflected beams, reflected in said surface;

controlling said beams to form a plurality of intersecting lines on said surface;

detecting at least one edge providing a difference in height of the edge relative to the surface based on the detected reflected line forming beams, wherein said edge substantially surrounds the predetermined landing area; and determining the position of the vertical take-off and landing aerial vehicle relative to the center of the predetermined landing area based on the detected at least one edge.

* * * * *